US00RE41162E

(19) United States
(12) Reissued Patent
Engel et al.

(10) Patent Number: US RE41,162 E
(45) Date of Reissued Patent: Mar. 2, 2010

(54) METHOD FOR PROVIDING SCALEABLE RESTART AND BACKOUT OF SOFTWARE UPGRADES FOR CLUSTERED COMPUTING

(75) Inventors: Norbert Engel, Nuernberg (DE); Eunan Muldoon, Swindon (GB); Ralph Wadlinger, Heroldsberg (DE); Reginald L. Allen, Bolingbrook, IL (US); Patrick W. McFarland, Chicago, IL (US); Guatam Patwari, Munster, IN (US); John H. Pokropinski, Woodridge, IL (US); Gail E. Tate, Naperville, IL (US); Ronnie E. Dean, Aurora, IL (US)

(73) Assignee: Lucent Technologies Inc., Murray Hill, NJ (US)

(21) Appl. No.: 10/909,249

(22) Filed: Jul. 30, 2004

Related U.S. Patent Documents

Reissue of:
(64) Patent No.: 6,681,389
Issued: Jan. 20, 2004
Appl. No.: 09/514,109
Filed: Feb. 28, 2000

(51) Int. Cl.
*G06F 9/44* (2006.01)

(52) U.S. Cl. ..... 717/173

(58) Field of Classification Search ..... 717/168–178; 709/220–223; 713/189–191, 2–3
See application file for complete search history.

(56) References Cited

U.S. PATENT DOCUMENTS

| | | | | | |
|---|---|---|---|---|---|
| 5,008,814 | A | * | 4/1991 | Mathur | 709/221 |
| 6,006,034 | A | * | 12/1999 | Heath et al. | 717/170 |
| 6,070,012 | A | * | 5/2000 | Eitner et al. | 717/168 |
| 6,163,811 | A | * | 12/2000 | Porter | 709/247 |
| 6,230,194 | B1 | * | 5/2001 | Frailong et al. | 709/220 |
| 6,324,692 | B1 | * | 11/2001 | Fiske | 717/171 |
| 6,363,499 | B1 | * | 3/2002 | Delo et al. | 714/15 |
| 6,453,468 | B1 | * | 9/2002 | D'Souza | 717/168 |
| 2002/0092010 | A1 | * | 7/2002 | Fiske | 717/168 |

* cited by examiner

*Primary Examiner*—Tuan Anh Vu

(57) ABSTRACT

Platform and/or application software on all online, machine/servers in a cluster is updated without manually taking each machine/server offline. Initially, platform and/or application software for updating is stored in respective directories in an APPLY phase. Next, the new platform and/or application software is activated with or without a trial/test phase in an ACTIVATE phase. Where the new platform and/or application software is activated with a trial/test phase, a ROLLBACK phase is either automatically or manually invoked by the application in the event of a failure of the new software for backing out the new platform and/or application software and reactivating the previous platform and/or application software. An OFFICLAL phase then transitions the new platform and/or application software to the official state followed by a REACTIVATE phase for reactivating the backup copy of the previous/old platform and/or application software after the new software has been made official.

7 Claims, 4 Drawing Sheets

METHOD FOR PROVIDING SCALEABLE RESTART AND BACKOUT OF SOFTWARE UPGRADES FOR CLUSTERED COMPUTING

Matter enclosed in heavy brackets [ ] appears in the original patent but forms no part of this reissue specification; matter printed in italics indicates the additions made by reissue.

TECHNICAL FIELD OF THE INVENTION

This invention relates generally to the programming of computers arranged in a cluster and is particularly directed to a method for providing scaleable restart and automatic backout of software upgrades for clustered computing applications when problems are encountered in the new, or updated, software package.

BACKGROUND OF THE INVENTION

There is a need in a clustered computing environment for easily and quickly installing updated platform and application software with a minimum of computer downtime and user interaction. The current approach for updating commercial servers typically involves stopping the application on each machine, taking the machine(s) to an off-line state, installing the updated software one server at a time, then bringing the machines back on-line, and restarting the application software. If a problem is detected in the updated software, the machine must be brought back to an offline state, the updated software is then backed out, and the machine and the software application is restarted using the previous software package. This is a manual process, with the user entering, appropriate instructions at each stage of the process. In addition, commercial software platforms generally have their own software update requirements.

The present invention addresses these limitations of the prior art priorities by providing a method of updating platform controlling or cluster controlling software as well as application software on all operating machines/servers in a cluster without manually taking each machine/server offline and performing a software update installation. In the event a problem with the update software is encountered, the inventive method allows updated software to be automatically backed out and the previously installed software is re-activated.

SUMMARY OF THE INVENTION

This invention contemplates a method for installing updated platform controlling or cluster controlling and application software in a manner which allows for the restarting or "activating" the new software concurrently on all machines in a cluster or for only one machine in the cluster through software control. This inventive software updating method provides for scaleable restart by allowing the activation of the software to occur by restarting all software on the machine, i.e., rebooting the machine, or by simply restarting components of the platform and/or the application software that has been updated. The inventive software updating method further provides for the automatic back out of the updated software during a test period if a problem in the updated software is detected. The inventive method is not dependent upon the implementation of any specific operating system or any particular software or hardware product and is thus universally applicable to clustered computing systems. This software update method is adapted for developing a software upgrade application that can be administered as part of a network management system, thus reducing the need to manually/physically perform the software upgrade one server at a time. The inventive software method thus accomplishes software updates more easily, quickly and economically than present approaches.

The inventive software updating method is characterized by five phases beginning with an APPLY phase for installing the new platform and/or application software into a directory, where the new software package consists of installation scripts, changed platform products, and other control/database files. Next, an ACTIVATE phase activates the new software as the running image for both the platform and application software. This activation is characterized as either activation with a trial/test phase or activation without a trial/test phase. If a failure, e.g., death of a process, occurs during the activation with trial/test phase, the new updated software is automatically rolled back. Next, if there is a problem with the new software when the new software has been activated with a trial/test phase, a ROLLBACK phase backs out the new platform and/or application software and re-activates the previous/old platform and/or application software. The ROLLBACK phase is either automatically invoked when a failure occurs or is manually invoked by the application. Next, an OFFICIAL phase transitions the new platform and/or application software to the official state or default executable image. Finally, a REACTIVATE (Back Out Last Official) phase activates the backup copy of the previous/old platform and/or application software after the new software has been made official. The present software method employs for each of the above described phases "assist functions" for performing software upgrades for use by the end user at the lowest level of implementation. Incorporating these "assist functions" at the lowest level of implementation provides the end user substantial flexibility in installing and activating the end user's application and platform software. These software assist functions also provide the present software method with universal applicability to clustered computing systems independent of the implementation of a specific operating system or particular hardware or software product.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, in which:

DETAILED DESCRIPTION OF THE PREFERRED EMBODIMENT

Figure 1:
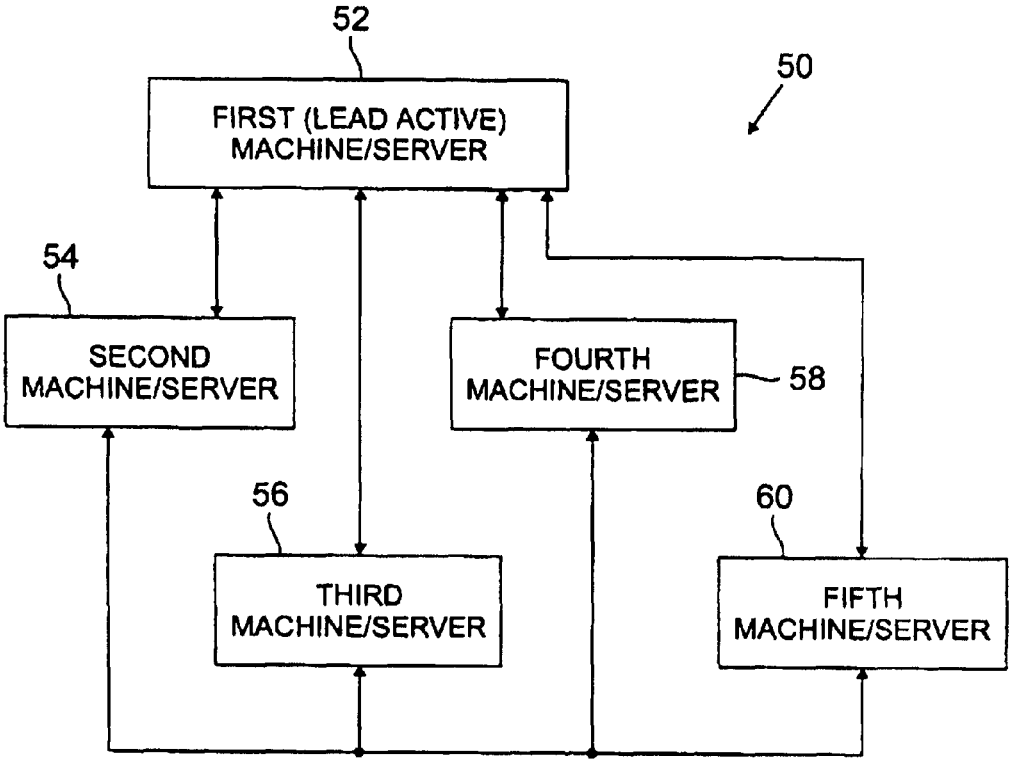
FIG. 1 is a simplified block diagram of a clustered computing arrangement with which the scaleable restart and backout of software upgrades method of the present invention is intended for use.

Referring to FIG. 1, there is shown a simplified block diagram of a clustered computing arrangement 50 with which the method of providing scaleable restart and backout of software upgrades of the present invention is intended for use. The clustered computing arrangement 50 includes first, second, third, fourth and fifth machines/servers 52, 54, 56, 58 and 60. Although FIG. 1 shows five connected machines/servers, the present invention is not limited to this number of machines/servers, but is applicable to virtually any number machines/servers arranged in a clustered computing system. In the clustered computing arrangement 50, the first machine/server 52 has been designated as the lead active machine/server for coordinating the operation of the various machines/servers in the clustered computing arrangement.

The software method of the present invention allows for a reduction in downtime when installing and executing, i.e., activating, updated platform and application software in a clustered computing system. As used herein the terms "upgraded" and "updated" as they relate to a more recent version of software being installed are used interchangeably.

Since new software is upgraded on a cluster wide basis, it is required that the new software be installed on all online machines/servers in the cluster prior to activation. The platform software has two software upgrade scenarios that must be followed in carrying out the method for providing scaleable restart and backout of software upgrades for clustered computing in accordance with the present invention: installation scenarios and activation scenarios. The installation scenarios are concerned with the installation of the updated/new software on the machine/server that will be activated later. The following cases are considered:

All machines/servers have the same version of updated/new software.

An updated/new software image has been installed and needs to be propagated to all online machines/servers in the cluster. This is accomplished by the application's image handling software or by manual downloads (e.g., ftp, rcp, or tape).

One or more machines/servers are being replaced and need to be updated with the latest version(s) of the software.

The activation scenarios are concerned with determining which set of software, platform and/or application, needs to be activated or re-activated (backed out). The following cases are considered:

Restarting the platform software on all online machines/servers in the cluster with/without a trial/test phase.

Restarting the application software on all online machines/servers in the cluster with/without a trial/test phase.

Restarting the application software component on one or more online machines/servers in the cluster with/without a trial/test phase.

Restarting both platform and application software on all online machines/servers in the cluster with/without a trial/test phase.

A version control file is used in the inventive method. This version control file contains information such as the location, checksum value, and version value of all files in the software image. This method examines the version control file in each of the phases described earlier. It serves as a database of all files contained within a software image and dictates what type of initialization (process restart, cluster reboot, or no start up action at all) is necessary to start running on the new updated software.

Described below are the directory structures, software upgrade phases, software upgrade functions, and supported software upgrade state transitions used by the software upgrade method of the present invention. The following platform directories begin with the letters "RCC" for Reliable Cluster Computer, which is a product of Lucent Technologies, Inc. of Holmdel, New Jersey. However, the present invention is not limited to the RCC software system and has applicability of virtually any software updating arrangement. Therefore, the letters "RCC" as used below could be replaced with virtually any other letter combination without restricting or limiting the operation or scope of the present invention.

Platform Disk Directory Structure

The following directories, identified by the names RCCNEWDIR, RCCSUDIR, and RCCBKUPDIR, are included as part of the platform disk directory structure, RCCBASEDIR, to support software upgrade of new platform software.

RCCBASEDIR The disk directory where the official or currently running files/binaries reside.

RCCNEWDIR The disk directory where the new files/binaries reside after the new software has been activated.

RCCSUDIR The disk directory where the new files/binaries are initially installed for this software algorithm method. This directory contains the new platform software package, which consist of installation scripts, changed platform products, and other control/database files. New files/binaries will be moved from this directory to the RCCNEWDIR directory during activation.

RCCBKUPDIR The disk directory where the current official files/binaries are stored (backed up) during an activation.

Default Application Disk Directory Structure

The following directories, identified by the environment variables APPLBASEDIR, APPLNEWDIR, APPLBKUPDIR, and APPLFAILDIR are provided to support software upgrade of new application software. It should be noted here that the entire application software image is upgraded with this default directory structure. If a single process is to be upgraded, the entire image in the disclosed embodiment is included with the single process. This allows for simple installation and activation of new application software. Also, the application software will always run under the APPLBASEDIR directory.

APPLBASEDIR The disk directory where the current running application software resides.

APPLNEWDIR The disk directory that contains the new software image of the application.

APPLBKUPDIR The disk directory that contains a copy of the application software that was previously running in the APPLBASEDIR directory prior to an activation of the new software.

APPLFAILDIR The disk directory that contains the image of the application software that was in the trial/test phase but was automatically rolled back due to a failure. Failure is defined as a death of a process when the software is in the trial/test phase.

An alternative to the default application directory structure described above is the capability of upgrading application software at the individual software component level. The user can select which application component to upgrade on one or more online machines/servers in the cluster. This provides the flexibility of updating a subset of application software rather than all application software onall machines/servers in a cluster.

Figure 2:
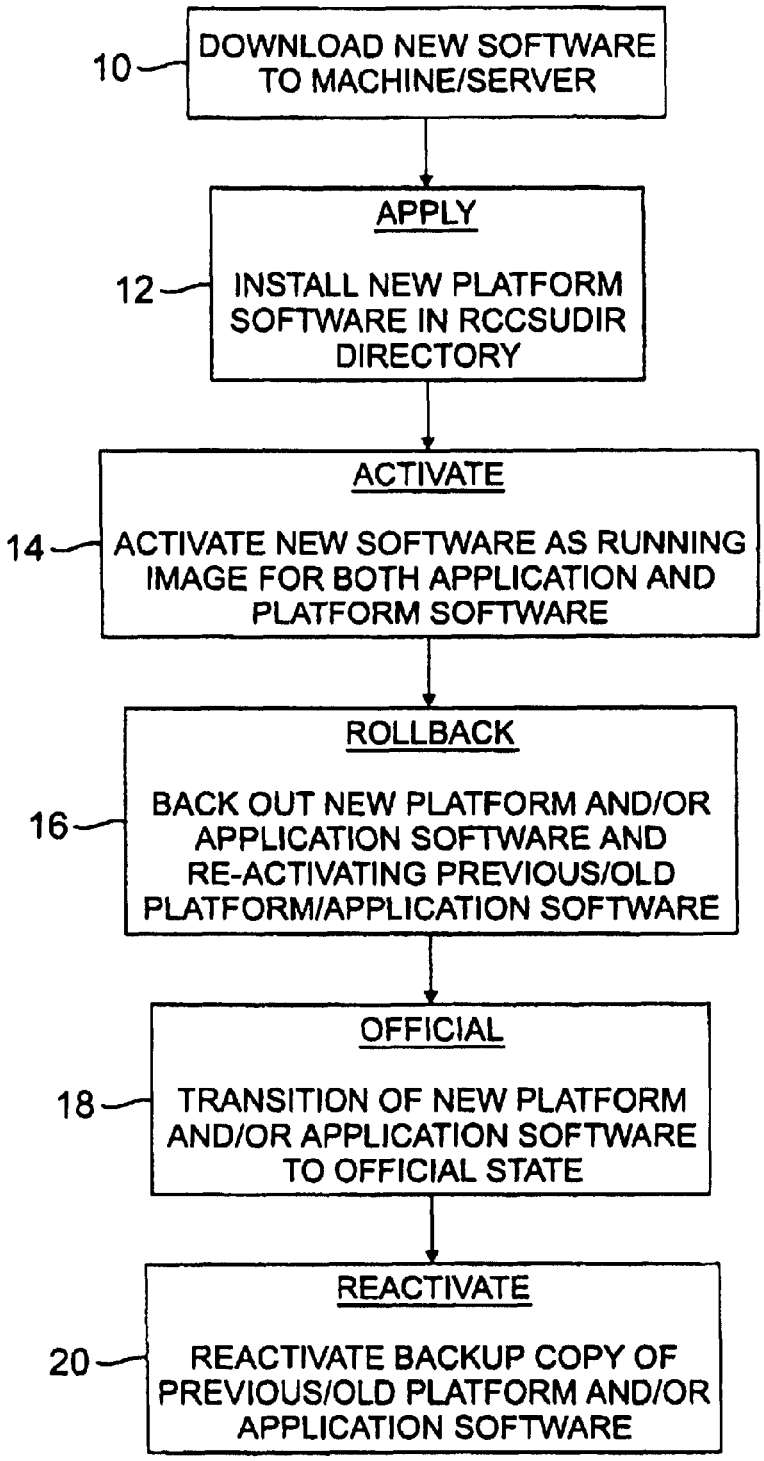
FIG. 2 is a simplified flow chart illustrating the steps involved in carrying out the method for providing scaleable restart and backout of software upgrades for clustered computing in accordance with the present invention.

Referring to the FIG. 2, there is shown a simplified flowchart of the steps involved in carrying out the method for providing scaleable restart and backout of software upgrades for clustered computing in accordance with the present invention. The inventive software upgrade method consists of five phases:

Apply
Activate
Rollback/Back out
Confirm/Make Official
Reactivate/Back Out Last Official There is a preliminary phase performed outside the scope of the software upgrade phases: downloading the new software to the machine/server shown as step 10 in the figure. The application is responsible for ensuring that the new software has been downloaded to the machines/servers and exists in the correct directory structures before beginning the upgrade process.

APPLY Phase

The APPLY phase shown at step 12 in FIG. 2 is responsible for installing the new platform software into the RCCSUDIR directory. New application software is installed into the APPLNEWDIR directory. New application software is installed in a location chosen by the application. The location of where the new software is installed is preferably such that inadvertent activation of the new software is not possible before the activation command has been issued.

ACTIVATE Phase

The ACTIVATE phase shown as step 14 in FIG. 2 is responsible for activating the new software as the running image for both the application and platform software. The activation is categorized as either activation with a trial/test phase or activation without a trial/test phase. In the case of an activation with a trial phase, the trial period interval is a relative time period between the time the activation occurs and the time the application chooses to transition the new software to the confirm/make official phase. If a failure (death of a process) or a machine reboot occurs during this phase, the new software is automatically rolled back (backed out).

For new platform software, the level of activation is one of the following:

a process restart;

a cluster-wide boot of all online machines/servers in the cluster; or no startup action performed.

Since libraries are global impacting, if any platform libraries are being updated, a cluster-wide boot of all online machines/servers in the cluster is performed. For new application software, the level of activation is dependent on the type of upgrade being performed: default application directory structure or an individual application component. The level of activation can be one of the following:

a cluster wide initialization of all online machines/servers in the cluster (default application directory structure is used);

a restart of the application processes;

a boot of the machine/server in the cluster on behalf of the application software component;

a cluster wide boot of all online machines/servers in the cluster on behalf of the application software component;

or no startup action at all for an application software component.

ROLLBACK Phase

The ROLLBACK phase shown as step 16 in FIG. 2 is responsible for backing out the new platform and/or application software and re-activating the previous/old platform and/or application software. It is a phase performed only when the new software has been activated with a trial/test phase. The ROLLBACK phase is either automatically invoked when a failure occurs or manually invoked by the application.

The trigger for the automatic ROLLBACK phase is via an event triggered by a failure. For example, a death of process can be specified as a failure event that results in the new software being automatically backed out. In addition, this phase allows automatic recovery to be performed whenever a machine/server is taken down while the software is in the trial/test period. When the software on the other machines/servers is backed out, this phase allows the downed machine/server to be brought back online and its software to be automatically backed out depending on the software upgrade status of the lead machine/server in the cluster.

For cases when the software on the other machines/servers is made official, this phase allows the downed machine/server to be brought back online and its software to be automatically made official depending on the software upgrade status of the lead machine/server in the cluster.

OFFICIAL Phase

The OFFICIAL phase shown as step 18 in FIG. 2 is responsible for transitioning the new platform and/or application software to the official state.

REACTIVATE

The REACTIVATE phase shown as step 20 in FIG. 2 is responsible for reactivating the backup copy of the previous/old platform and/or application software after the new software has been made official. This phase is similar to the ROLLBACK phase, however, the transition to this phase is always manually requested by the application, no trial/test phase can be specified and no backup of the currently running software is made.

Table I defines the software upgrade states and values that can be assigned to the Software Upgrade (SU) state fields in the platform software's control file.

TABLE 1

| Return Mnemonic | SU State | Description |
|---|---|---|
| 10 | SUAPPLYCMPLT | SU Apply Complete |
| 11 | SUAPPLYIP | SU Apply In Progress |
| 15 | SUAPPLYFAIL | SU Apply Failed |
| 20 | SUTRIAL | SU In Trial/Test Period |
| 21 | SUACTTRIALIP | SU Transition to Trial/Test in Progress |
| 22 | SUACTNOTRIALIP | SU Transition to No Trial/Test In Progress |
| 25 | SUACTFAIL | SU Activate Failed |
| 31 | SUROLLBKIP | SU Rollback In Progress |
| 32 | SUMANROLLBKIP | SU Manual Rollback In Progress |
| 35 | SUROLLBKFAIL | SU Rollback Failed |
| 40 | SUOFCCMPLT | SU Official Complete |
| 41 | SUOFCIP | SU Official In Progress |
| 45 | SUOFCFAIL | SU Official Failed |
| 50 | SUREACTCMPLT | SU Reactivation Complete |
| 51 | SUREACTIP | SU Reactivation In Progress |
| 55 | SUREACTFAIL | SU Reactivation Failed |

Figure 3:
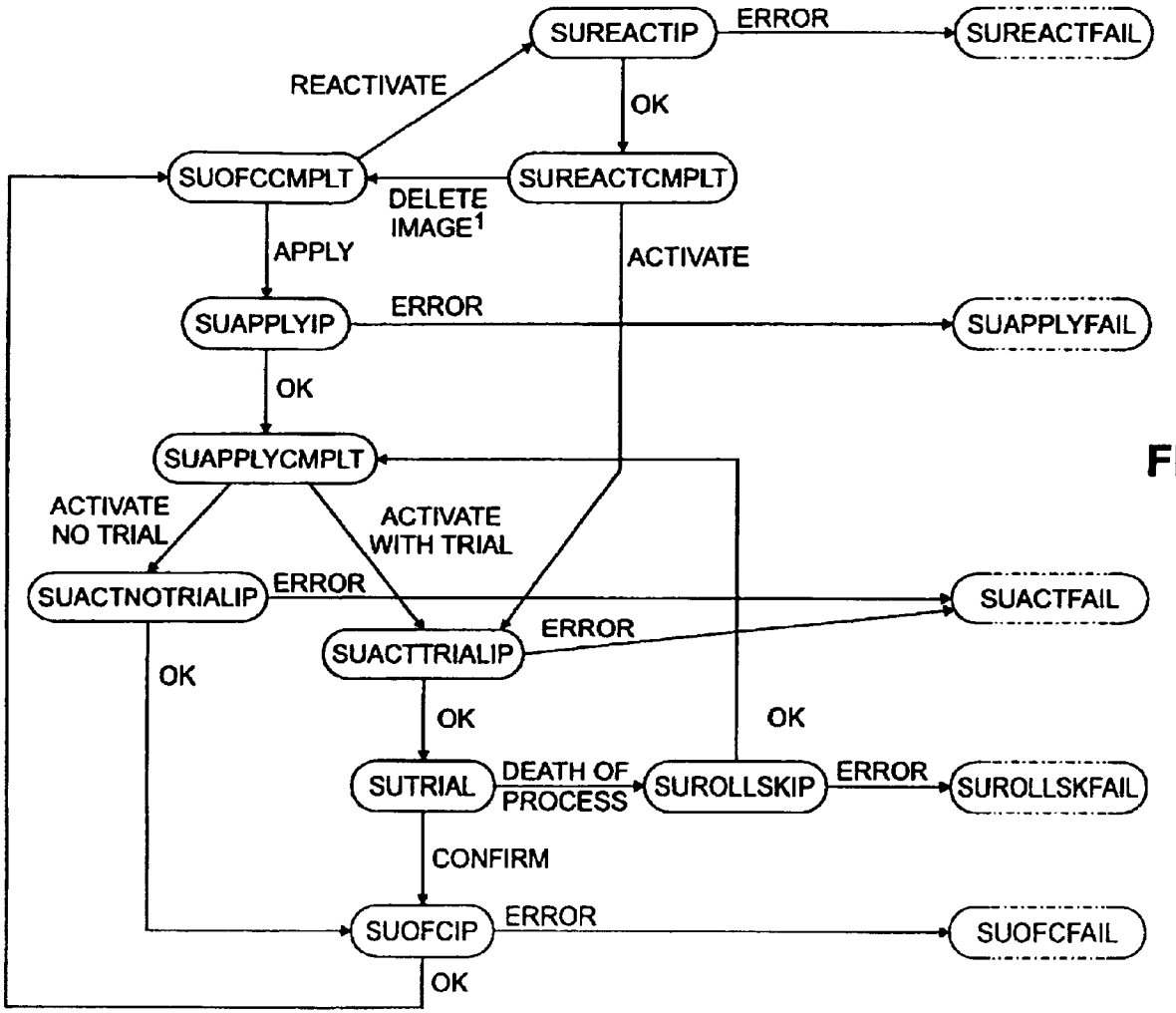
FIG. 3 is a simplified schematic diagram of the state transitions in the scaleable restart and backout of software upgrades for clustered computing method of the present invention.

Referring to FIG. 3, there is shown in simplified schematic diagram form the state transitions in the present invention. The legend for this state transition diagram is as follows:

SUOFCCMPLT—SU Official Complete
SUAPPLYIP—SU Apply in Progress
SUAPPLYCMPLT—SU Apply Complete
SUACTNOTRIALIP—SU Transition to No Trial/Soak in Progress SUACTTRIALIP—SU Transition to Trial/Soak in Progress SUTRIAL—in Trial/Soak Period SUOFCIP—SU Official in Progress SUREACTIP—SU Reactivation in Progress SUREACTCMPLT—SU Reactivation Complete SUROLLBKIP—SU Rollback in Progress SUREACTFAIL—SU Reactivation Failed SUAPPLYFAIL—SU Apply Failed SUACTFAIL—SU Activation Failed SUROLLBKFAIL—SU Rollback Failed SUOFCFAIL—SU Official Failed For cluster wide software upgrades, the SU state SUOFCCMPLT is used to distinguish between a dual SU session (both platform and application software is being updated) and an individual SU session (platform only or application only software is being updated). For example, a platform only SU session requires the application SU State being set to SUOFCCMPLT throughout the SU session, unless the previous/old platform software is to be reactivated. In this case, the application SU State must be set to SUAPPLYCMPLT in order to perform the REACTIVATE phase only on the platform software.

The clustered computing software upgrade method at the cluster wide level allows retries in all "fail" (FAIL) and "completed" (CMPLT) SU states. These retries allow recovery actions to be performed. Such recovery actions may include synchronizing all machines/servers in the cluster to run on the same software. The clustered computing software upgrade method at the cluster-wide level does not allow SU transitions for any of the "in progress" (IP) SU states. These SU states are used internally by the platform software upgrade processes which are managing/performing the upgrade phases.

The software upgrade method of the present invention accomplishes its task by invoking assist functions for each phase described above. These assist functions provide a level of abstraction in performing software upgrades to the end user. The abstraction occurs at the lowest level of implementation. It is here where the user has the flexibility of installing and activating its own application software. As described above, either the default application directory structure or the individual application components could be used to accomplish a software upgrade. For example, the user may define its own application software image under the default application directory structure and perform an upgrade of the whole image on all machines/servers in the cluster. Alternatively, the user may have a third party application software (e.g., Orbix, Informix, ACC, etc.) defined as an application Software Component. Depending on the third party software installation procedures, the user can incorporate such procedures at the lowest level of implementation and activate it via boot, process restart, or no action at all.

The following software update assist scripts or functions are used by the SU processes (SUapply, SUactivate, etc.) to perform the directory structure manipulation of products associated with each software update. Once created, each of the following assist scripts will not normally change unless there is a special requirement for the software update that the scripts do not address. These assist scripts perform whatever manipulation is required to the files on the machines in which the software is being updated prior to performing the software update operation. These assist scripts serve as a layer between the software algorithm that performs the various phases described above and the actual operating system. For example, the "apply" assist script moves various files from one directory structure to another prior to activating the updated software. By allowing the user to specify the assist scripts used in an individual application, specific functionality based upon the operating system or the platform the user is working on can be incorporated in the software update method of the present invention. These assist scripts thus separate the particular platform the user is working on from the overall algorithm for performing the software update. This provides the software update method of the present invention applicability to virtually any platform as well as to any specific application. By changing the assist scripts, the software update functions for various operating systems can be accommodated using the software update method of the present invention.

The software assist scripts are listed below in two groups, with the first group relating to platform software (RCC), and the second group directed to application (app) software.

apglyrccsu. This software assist script applies new platform (RCC) files/binaries by. uncompressing the archive file and unbundling it under RCCSUDIR in either bin, usr and/or var files. This software assist script is executed in the APPLY phase.

bkuprccsu. This software assist script backs up the current running platform (RCC) files/binaries by copying them to RCCBKUPDIR. This software updated assist script is executed in the ACTIVATE phase. This assist script, in effect, converts the software update to the running version of the software in the ACTIVATE phase. The current running platform files/binaries are copies as a backup in the event problems are encountered in the update software.

acctrccsu. This software update assist script moves the updated platform (RCC) files/binaries from the RCCSUDIR directory to the RCCNEWDIR directory if activation with trial is selected, and to RCCBASEDIR directory if activation with no trial is selected. This assist script is executed in the ACTIVATE phase. This assist script thus moves files from the applied directory into their proper location where they normally exist on the machine and activates these files as the new software program controlling the operation of the machine.

rollbackrccu. This assist script moves the updated platform (RCC) files/binaries from the RCCNEWDIR directory to the RCCSUDIR directory. This assist script becomes operable when the new updated software which has just been activated exhibits an error or encounters problems. This assist script takes the updated software currently running and moves it back into the SU directory and takes the files that were backed up (the original version of the software) and moves it back into its original location and activates the original software. System software is thus restored to its former state. This software update assist script is executed in the ROLLBACK phase.

mkofcrccsu. This software update assist script moves the updated platform (RCC) files/binaries from the RCCNEWDIR directory to the RCCBASEDIR directory. This assist script is implemented after the updated software has been running in an error-free manner and it is desired to make the updated software official. The updated software is made official by moving, or storing, it in its permanent location on the machine. Once stored in its permanent storage location, the updated software becomes the "official" or "default location" version of the software. Thereafter, even if a problem occurs in the software, a rollback is not performed.

reactrccus. This software update assist script moves the updated platform (RCC) files/binaries from the RCC- BASEDIR directory to the RCCSUDIR directory. In this operation, the updated version of software that was just made official is backed out and the previous, or last official, software is reactivated because of some late occurring problem in the updated software such as instability.

The following list of software update assist scripts is used in updating the application (APP) software.

applyappsu. Currently, no action is taken for this software update assist script for updating application software (APPL SUs).

bkupappsu. This assist script causes the updated application files/binaries to be moved from the APPLBASEDIR directory to the APPLBKUPDIR directory. This assist script is executed in the ACTIVATE phase.

actappsu. This software update assist script causes the updated application files/binaries to be moved from the APPLNEWDIR directory to the APPLBASEDIR directory. This assist script is also executed in the ACTIVATE phase.

rollbackappsu. This software update assist script causes the application software files/binaries to be moved from the APPLBASEDIR directory to the APPLNEWDIR directory for manual rollback requests. The updated application files/binaries are moved from the APPLBASEDIR directory to the APPLFAILDIR directory for automatic rollback requests. Also, the updated application software files/binaries stored in the APPLBKUPDIR directory are moved to the APPLBASEDIR directory. This assist script is executed in the ROLLBACK phase.

mkofcappsu. Currently, no action is taken for this software update assist script for updating application software (APPL SUs).

reactappsu. This software update assist script moves the updated application files/binaries from the APPLBASEDIR directory to the APPLNEWDIR directory and from the APPLBKUPDIR directory to the APPLBASEDIR directory. This assist script is executed in the REACTIVATE phase.

SU ROLLBACK is used to re-activate the current official version of the software that resides in the application backup directory (APPLBKUPDIR) and the platform (RCC) backup directory (RCCBKUPbIR). The rollback to the official version may be for either or both the application and platform software on all servers in the cluster. However, if any processor node has reached the SUOFCCMPLT state, then a roll back cannot be performed. A rollback can only occur if the SU status is SUTRIAL IP or SUTRIAL. A successful rollback results in the SUSTATUS of SUOFCCMPLT.

Rollback of SU products can occur either manually via a direct call to SU rollback or may be automatically triggered by the platform (RCC) SU processes when a failure occurs during the "trial" phase of an update. SU rollback can only be invoked when the SU status of either platform and/or application software is in the "apply" or "trial" phases. The application calling SU rollback does not have to check the SU status of the machine. SU rollback will perform the checks and return the appropriate return codes. An automatic rollback can occur if the platform (RCC) software detects a failure, e.g., death of a platform monitor process during a trial phase. Therefore, the application software that accesses the "backup" images directories must insure that the "backup" directories are not removed, emptied, etc., unless the software is in the official/default state.

In the present invention, a software problem which automatically triggers a rollback of the previous software stored in the platform or application backup directory is defined in terms of two conditions. First, an automatic rollback is triggered in the event a process or program dies or restarts itself during the ACTIVATE phase. Alternatively, a re-booting of a machine wherein every process on the machine restarts also results in the automatic rollback to the previously installed platform or application software. If either of these conditions occurs during the ACTIVATE trial phase then an automatic rollback is performed by the software update method of the present invention. The activation phase utilizes the scripts RCCSUDIR/actrccsu and RCCSUDIR/actappsu to perform the directory structure manipulation during the activate phase. These scripts invoke bkuprccsu and bkupappsu scripts to create backup images of the default disk images. The level of activation, i.e., process restart or boot, for platform (RCC) products is determined by the "initialization type" found in the RCCSUDIR/RCCVERSION file.

By examining the list of platform updated software products that changed and the application subfield of the RCCSTATUS field in the system file, the level of initialization to activate the SU is determined. If application updated software products have changed, a full reboot is required. If the components of the software update package require a simple per process activation, each process/product whose version number matches the new system version number associated with the SU must be restarted. The application Software Component is not affected by the restart of individual platform (RCC) processes. Thus, the present invention looks at the set of software products that have changed and determines the level of activation required for each software product that has been updated in order to activate the entire system. The program looks at the highest level of activation required, and implements that level of activation. The highest level of activation is rebooting all machines such as in the case of updating a common library shared by many applications. A lower level of activation would be the execution of a process restart limited to a specific software process. Finally, the program may determine that no activation is required such as in the case of a data file which requires no initialization, resulting in no action being taken upon activation of the system. The present invention thus allows the user to define what level of activation is to be used in reactivating the system following a software update. An example of an implementation of this aspect of the present invention is the use of a data table associated with each binary product. Within the data table are specified three values for each updated binary product. One value represents a rebooting of all of the machines in the clustered system. A second value specifies a restart of a particular application in the updated software package, while a third value stored in the data table indicates that no activation is required such as in the case of transient processes that run for short intervals at a time.

Figure 4:
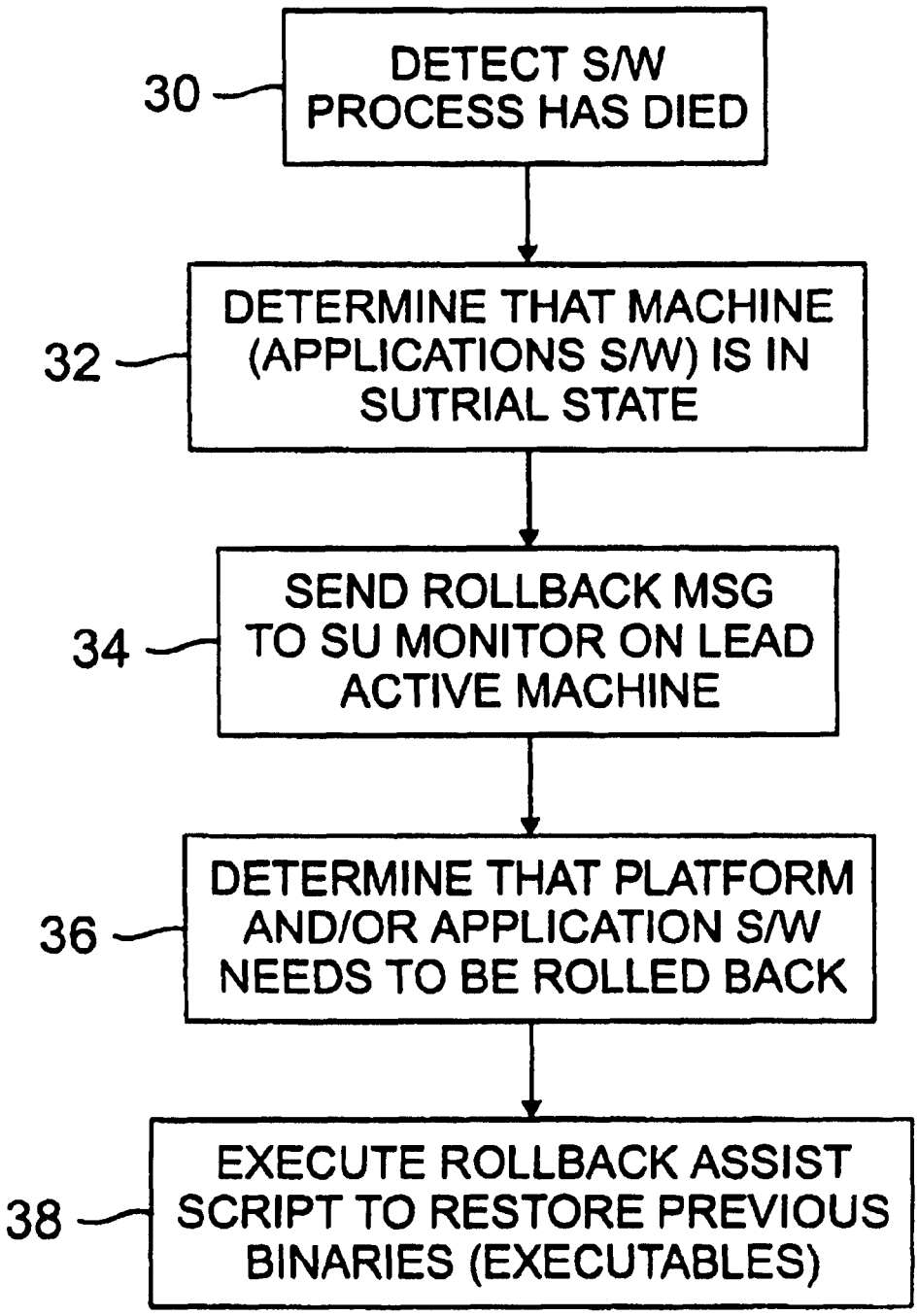
FIG. 4 is a simplified flow chart illustrating the steps involved in providing automatic rollback of an updated version of software and reactivating the current official version of the software running a clustered computing system in accordance with one aspect of the present invention.

Referring to FIG. 4, there is shown a simplified flow chart illustrating the steps carried out by the SU monitoring agent in the automatic rollback of platform and/or application software when a problem is encountered with the newly installed updated software. In carrying out automatic rollback, the SU monitoring agent detects that a platform or application process has died at step 30. The SU monitoring agent then at step 32 determines that the machine (application software) is in a SUTRIAL state by calling the SUINTRIAL macro which is a set of instructions for reading a data file to determine if the software update process is in the trial phase. The automatic backout feature of the present invention is available only if the software update process includes a trial phase. If an error occurs in the updated software and the software update process is not in a trial phase, then no automatic corrective action is available (e.g., rollback/backout).

At step 34, the SU monitor sends an SU rollback message to the SU monitor on the lead active machine which, in general, controls the operation of the other machines. The SU rollback message is provided to the backout monitor in the lead active machine to initiate rollback of the version of software currently running. The SU monitor then at step 36 determines if either the platform or the application software, or both the platform and application software, need to be rolled back. If it is determined at step 36 that the platform and/or application software need to be rolled back, the SU monitor executes the software update rollback script and reboots all of the machines in the cluster in order to reactivate the previous, or old, software.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawing is offered by way of illustration only and not as a limitation. The actual scope of the invention is intended to be defined in the following claims when viewed in their proper perspective based on the prior art.

We claim:

1. For use in a cluster computing arrangement wherein plural machines operating under original platform controlling software carry out various applications in accordance with original application software, a method of updating platform and/or application software comprising the steps of:

installing updated platform software in a platform software directory and/or updated application software in an application software directory;

activating the updated platform software and/or updated application software in the cluster of machines during operation of the machines, wherein activating the updated platform software and/or updated application software includes selected from one of the following; a process restart, a cluster-wide boot of all online machines in the cluster, and no startup action performed as determined by the highest restart activation level of the updated platform and/or a software being performed;

monitoring operation of the cluster of machines under the control of the updated platform software and/or updated application software;

automatically backing out the updated platform and/or updated application software upon detection of a problem in the operation of the updated platform and/or updated application software; and reactivating a backup copy of the original platform software and/or original application software following backing out of the updated platform and/or updated application software; or converting the updated platform software and/or updated application software to an official state if a problem in the operation of the updated platform software and/or updated application software is not detected;

wherein each of the steps of installing, activating, backing out, reactivating and converting has an associated software update assist script.

2. The method of claim 1 wherein the step of activating the updated platform and/or updated application software includes providing a trial/test phase having a designated time period between activating the updated platform and/or updated application software and transitioning the updated platform and/or updated application software to the official state for testing the updated platform and/or updated application software.

3. The method of claim 2 further comprising the step of automatically backing out/rolling back the updated platform and/or updated application software if said trial/test phase is not successfully completed within said designated time period.

4. The method of claim 1 wherein each of said software assist scripts can be changed in accordance with the specific platform and/or application software being updated.

5. The method of claim 1 further comprising the step of copying the original platform and/or original application software in a directory for possible use as said backup copy upon detection of a problem in the operation of the updated platform and/or updated application software.

6. The method of claim 1 wherein the step of installing the updated platform software and/or updated application software respectively in platform and/or application software directories includes uncompressing and unbundling the updated platform and/or updated application software.

7. The method of claim 1 further comprising the step of defining a problem in the operation of the updated platform and/or updated application software as the death or restart of a process or program during activation of the updated platform and/or updated application software.

* * * * *